United States Patent Office 3,169,150
Patented Feb. 9, 1965

3,169,150
PROCESS FOR RECOVERY OF BROMO-
NITROALKANE
Gustave B. Bachman, West Lafayette, Ind., assignor to
Purdue Research Foundation, a corporation of Indiana
No Drawing. Filed Oct. 14, 1963, Ser. No. 316,173
3 Claims. (Cl. 260—646)

This invention relates to a process for the separation and recovery of a bromonitroalkane from a mixture of it and dimethylformamide and is particularly concerned, for instance, with the recovery of a beta-bromonitroalkane from a reaction product mixture containing it and obtained by the reaction of certain nitroalcohols with phosphorous tribromide in the presence of dimethylformamide (DMF).

U.S. Patent No. 3,054,829, hereby incorporated by reference, discloses an improved process for the production of beta-bromonitroalkane by the reaction of a nitro alcohol having the formula:

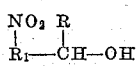

where R is alkyl or hydrogen; $R_1$ is cycloalkyl or of the formula:

and $R_2$ is alkyl, hydrogen, or hydroxyalkyl, with phosphorous tribromide, the improvement involving carrying out the reaction in the presence of dimethylformamide.

In carrying out the process described in the aforementioned patent no less than about 1 mole of phosphorous tribromide for each mole of nitroalcohol is preferably utilized, although when diols or triols of the nitro alcohols are utilized, increased amounts of the tribromide are desirable. Suitable nitro alcohols include, for instance, 2-nitro-1-propanol, 2-nitro-1-butanol, 2-nitro-2-methyl-1-propanol, tris(hydroxymethyl)nitromethane, 2-nitro-2-methyl-1,3-propanediol, 1-(1-nitrocyclohexyl)ethanol, 2-nitro-2-methyl-1-butanol, 2-nitro-2-methyl-1-decanol, 1-nitro-2-butanol, and the like.

The temperature conditions under which the process is conducted vary depending upon the nitroalcohols brominated but are generally from about 20 to 100° C., preferably from about 50 to 90° C. The dimethylformamide can be employed in small catalytic amounts but is preferably utilized in amounts necessary to allow it to serve as solvent for the reactants and reaction product as well as a catalyst for the reaction. When the dimethylformamide is utilized in small catalytic amounts, other suitable solvents can be used, for instance, chloroform, carbon tetrachloride, ethylene dichloride, and the like.

Although the use of dimethylformamide in the above-described process provides good yields of bromonitroalkanes, the recovery of these yields has presented a perplexing problem. It has been our experience, for example, that mere cooling followed by distillation fails to provide consistently high recovery of the excellent yields present in the reaction product mixture of bromonitroalkanes. The cause of the severe loss of recoverable yields often experienced is not known for certain and we do not care to be bound at the present time by any hypothesis or theories in explanation of the deleterious effect.

It has been discovered, however, that the present invention provides a highly reliable method for consistently recovering substantially all the bromonitroalkanes present in the product mixture resulting from this reaction. According to the method of the present invention the reaction mixture, which is composed of the desired bromonitroalkane together with unconverted reactants, dimethylformamide and by-products, is drowned in water, for instance by contacting about 1 part by volume of the reaction mixture with about 1 to 20 parts or more by volume of water, preferably 2 to 10 parts, maintained at a temperature generally of about 5 to 50° C., for instance, by the use of cracked ice. The term "drowned" as employed in the art refers to quenching the reaction and providing a surplus of water for solvent purposes. The contacting can be conducted by mixing with agitation, e.g. stirring, for generally at least about 1 minute up to about 90 minutes or more if desired, usually about 15 to 60 minutes.

The water mixture is contacted with an organic solvent selective for the bromonitroalkane and not selective for the dimethylformamide to produce an aqueous phase and an organic, e.g. non-aqueous, phase. The non-aqueous layer resulting from the contacting is separated from the aqueous layer also formed and the organic layer containing the nitrobromoalkane is separated, e.g. by liquid-liquid separation means such as by distillation. In a preferred method, after the water-contacting step, the admixture is extracted with ether, and the resulting aqueous layer and non-aqueous ether layer are separated, e.g. decanted. The non-aqueous layer can then be dried, evaporated and subjected to distillation for the recovery of the bromonitroalkane.

Although the aforementioned patent is directed to the use of dimethylformamide (DMF) as a solvent-catalyst in the reaction set forth, other liquid N,N-dialkyl amides e.g. N,N-diethylformamide; N-methyl, N-ethylformamide; and N,N-dimethylacetamide, can also be utilized and the present invention contemplates the recovery of bromonitroalkanes from a reaction product produced using such other amides. DMF is preferred and the invention has been and will be described hereinafter using DMF. It will be obvious, however, to those versed in the art that the present invention is not limited to reaction products produced by the use of DMF and can be practiced when other suitable liquid N,N-dialkylamides are utilized as a solvent-catalyst for the reaction to produce a reaction product containing bromonitroalkane.

The solvent used in the extraction step of the present invention can be any water-insoluble, organic solvent selective for the bromonitroalkane and not selective for the DMF which solvent is inert to the bromonitroalkane and DMF and has a boiling point different from the bromonitroalkane such that it can be easily separated, e.g. fractionally distilled. A boiling point difference of about 3 to 10° C. is usually sufficient. The solvent should advantageously boil at a temperature less than the boiling temperature of the bromonitroalkane. Suitable solvents include organic solvents containing from about 1 to 10 carbon atoms, for instance, aliphatic or alicyclic ether compounds, e.g. lower alkyl ethers such as diethyl ether and dibutyl ether for instance. Other suitable solvents include tetrahydrofuran and ethylacetate. Other equivalent solvents will be apparent to those versed in the art, however, the invention will be further described and claimed using an ether as the example of the solvent although equivalents are intended to be covered. A solvent such as an ether is advantageous in that it can be readily distilled under a slight vacuum (e.g. 300 mm. Hg) and at a low temperature to preclude the possibility of deleteriously affecting the bromonitroalkanes with higher temperatures.

The following example is included to further illustrate the present invention.

*Example I*

To a 500-milliliter flask equipped with an agitator containing 150 mls. of dimethylformamide and 59.5 grams of 2-nitro-1-butanol were added 135.5 grams of phosphorous tribromide, the temperature of addition being maintained at about 55° C. On completion of the addition of phosphorous tribromide, the resulting solution was stirred for six hours and then heated to 60° C. and maintained at that temperature for two hours. The thus treated reaction mixture was then drowned by pouring it into 500 mls. of water maintained at a temperature of about 25° C. by its admixture with cracked ice and the resulting aqueous mixture was stirred for about 45 minutes. The aqueous mixture was then extracted with ether and the resulting aqueous layer and non-aqueous ether layer were separated by decantation. The non-aqueous layer was dried and distilled under a vacuum to give 40.0 grams of 1-bromo-2-nitrobutane.

*Examples II to VI*

The procedure set forth in Example I is essentially followed except the nitroalcohol listed in the following table for the respective example designated is used instead of 2-nitro-1-butanol to provide the product set forth:

| Example | Nitroalcohol | Product |
|---|---|---|
| II | Tris(hydroxymethyl)nitromethane. | Tris(bromomethyl)nitromethane. |
| III | 2-nitro-2-methyl-1,3-propanediol. | 2-nitro-2-methyl-1,3-dibromopropane. |
| IV | 1-(1-nitrocyclohexyl)ethanol. | 1-(1-nitrocyclohexyl)-1-bromoethane. |
| V | 1-nitro-2-butanol. | 1-nitro-2-bromobutane. |
| VI | 2-nitro-1-propanol. | 2-nitro-1-bromopropane. |

It is claimed:

1. A process for the recovery of bromonitroalkane from the reaction product mixture containing the same and obtained by the reaction of a nitroalcohol having the formula:

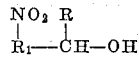

wherein R is a member selected from the group consisting of alkyl and hydrogen; $R_1$ is selected from the group consisting of cycloalkyl and of the formula:

wherein $R_2$ is a member selected from the group consisting of alkyl, hydrogen and hydroxyalkyl with phosphorous tribromide in the presence of dimethylformamide which comprises contacting the reaction product mixture with water maintained at a temperature of about 5 to 50° C. to form an aqueous and an organic layer, separating the organic layer from the aqueous layer formed and distilling the organic layer to obtain nitrobromoalkane.

2. The recovery process of claim 1 wherein the organic layer is separated from the aqueous layer by solvent extraction.

3. The recovery process of claim 2 wherein the solvent used is diethyl ether.

No references cited.